No. 854,918. PATENTED MAY 28, 1907.
H. WEBER.
ELECTRIC GOVERNOR.
APPLICATION FILED APR. 30, 1906.
2 SHEETS—SHEET 1.
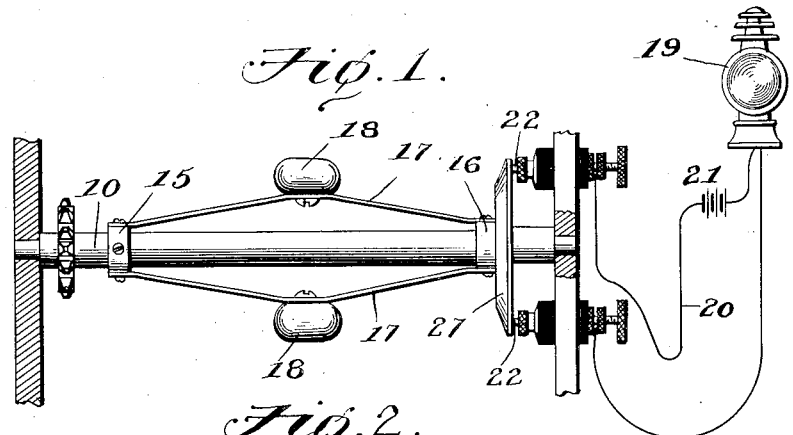
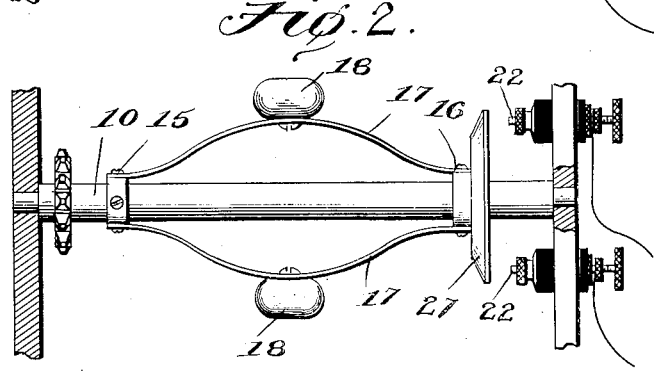
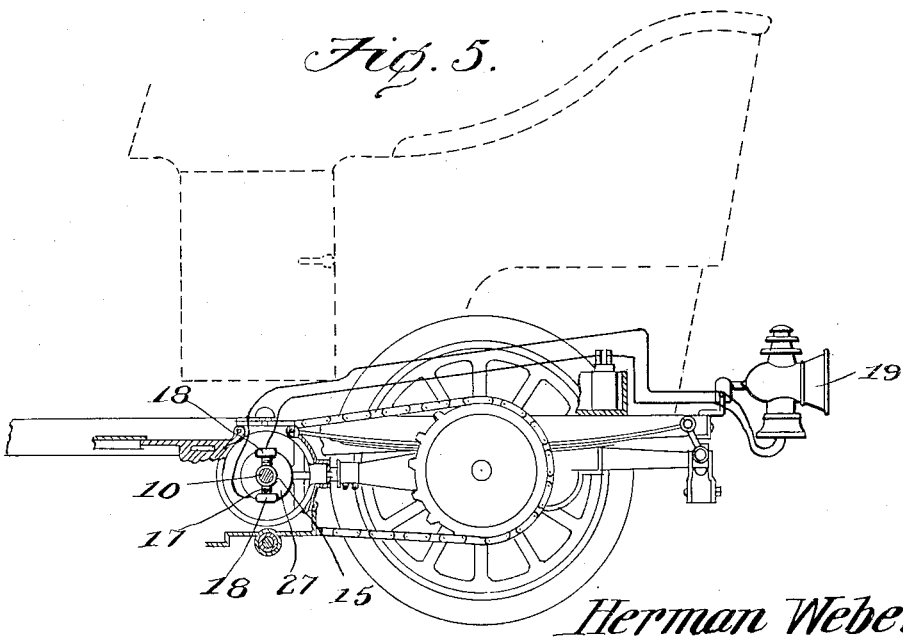
WITNESSES:
*Herman Weber,*
INVENTOR.
By C.A.Snow&Co
ATTORNEYS No. 854,918.
PATENTED MAY 28, 1907.
H. WEBER.
ELECTRIC GOVERNOR.
APPLICATION FILED APR. 30, 1906.
2 SHEETS—SHEET 2.
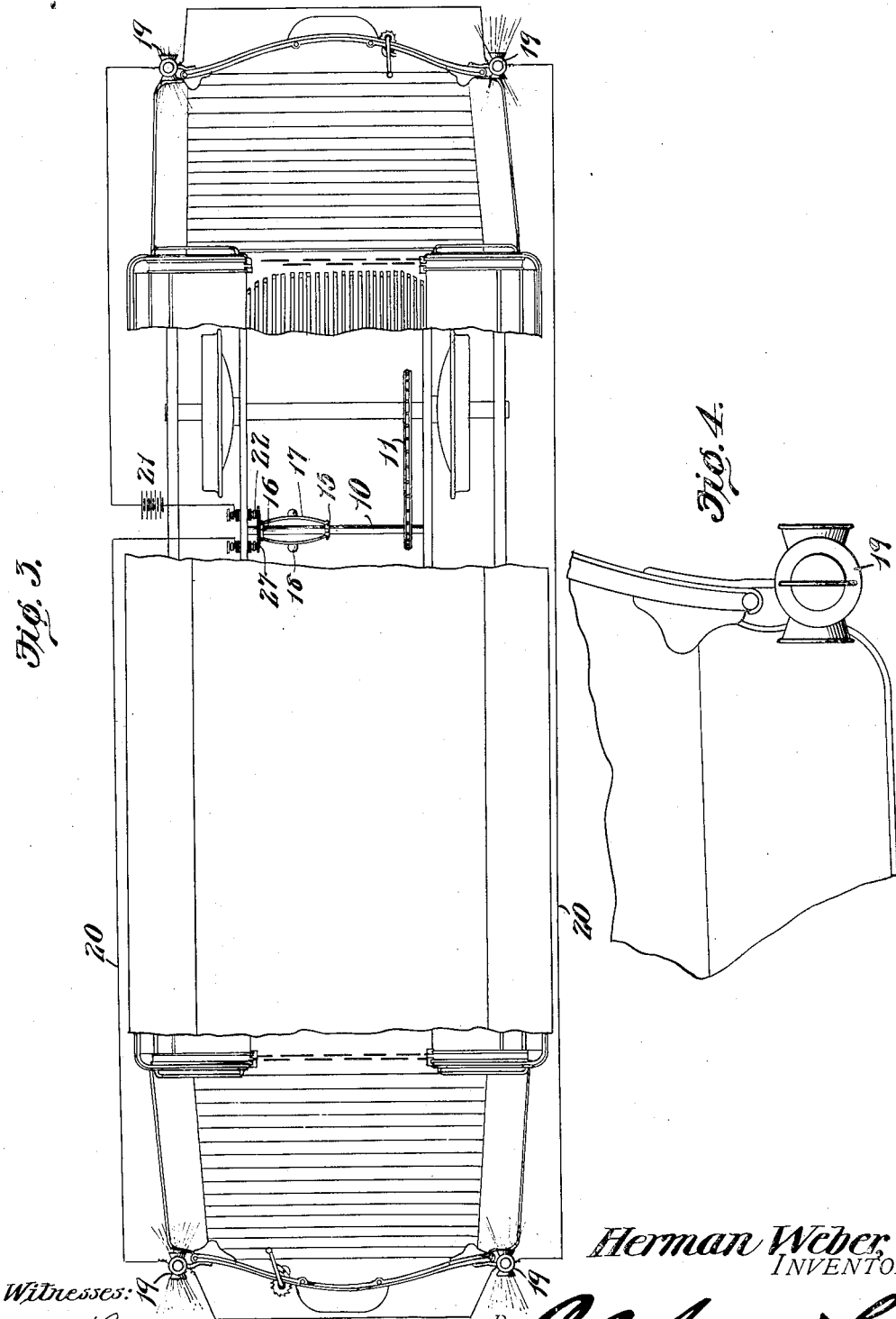
Herman Weber,
INVENTOR
Witnesses:
By C. A. Snow & Co
ATTORNEYS

UNITED STATES PATENT OFFICE.

HERMAN WEBER, OF COLORADO SPRINGS, COLORADO.

ELECTRIC GOVERNOR.

No. 854,918.      Specification of Letters Patent.      Patented May 28, 1907.

Application filed April 30, 1906. Serial No. 314,538.

*To all whom it may concern:*

Be it known that I, HERMAN WEBER, a citizen of the United States, residing at Colorado Springs, in the county of El Paso and State of Colorado, have invented a new and useful Electric Governor, of which the following is a specification.

This invention relates to automatic signaling devices, and has for its principal object to provide a means for automatically closing an electric circuit and lighting a lamp or visible alarm or signal, or for the purpose of sounding an audible alarm.

A further object of the invention is to provide a circuit closing device for connection to any revoluble member, and which is so arranged as to automatically close a signaling or alarm circuit when the revoluble member stops, and to automatically break the circuit when the movement is again started, or vice versa.

A still further object of the invention is to provide a signaling device for use in connections with cars, automobiles and other vehicles which will automatically light when the car is stopped, and will be turned off while the car is in motion.

A still further object of the invention is to provide a device of this class in which a signal is automatically disposed when the car or other vehicle stops, and further to employ a signaling means for the purpose of lighting the steps of the vehicle.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is an elevation of an automatic circuit closing device constructed in accordance with the invention, showing the same in circuit closing position. Fig. 2 is a similar view showing the parts in circuit breaking position. Fig. 3 is a plan view in the nature of a diagram showing the application of the device to a street car. Fig. 4 is an elevation, showing in the manner in which the signal is employed for lighting the car steps. Fig. 5 is a detail view, illustrating the application of the invention to an automobile.

Similar numerals of reference are employed to indicate corresponding parts throughout the several figures of the drawings.

In carrying out the invention, the shaft 10 is arranged on the car or other vehicle, and is arranged to be driven in any suitable manner, as by means of sprocket chain connections 11 from the axle of the car or any other revoluble member. To the revoluble member 10 is rigidly secured a sleeve 15, and slidably mounted on said revoluble member is a second sleeve 16. These two sleeves are connected to each other by one or more leaf springs 17 which carry weights 18, the weights being disposed about mid-way of the lengths of said sleeves, and being movable outward under the influence of centrifugal force from the position shown in Fig. 1 to the position shown in Fig. 2.

At any convenient point is placed a signal or alarm, which, in the present instance, is shown in the form of a lamp 19, and said lamp is connected in a cirucit which includes a source of energy 21. The terminals of this circuit are in the form of pins 22 that are supported by the frame, and suitably insulated therefrom, the pins being threaded, and being adjustable in the direction of their lengths. The inner ends of these pins are arranged to be engaged by a metal disk 27 that is carried by the collar 16, and when the revoluble member has stopped, or its speed has lowered below a predetermined point, the disk 27 will be moved into engagement with the terminals 22, and the electric circuit will be closed, thus lighting the lamp to display a visible signal, or closing the circuit of an audible signal, where the device is to be used for alarm purposes, generally. While the revoluble member is in motion, the weights 18 will be thrown outward by centrifugal force, and the disk 27 will be thrown away from the terminals 22, thus opening the circuit. It will be seen that as the disk slows down it will come into engagement with the contacts and the latter will thus be polished and kept in good condition for closing the electric circuit.

The device is principally intended for displaying a signal on street cars, and in Fig. 3 a number of lamps 19 are shown, there being two of such lamps at each end of the car, and these are at present shown as connected in series with the source of energy, and the circuit closer. The lamps are arranged, as shown in Figs. 3 and 4, so that the steps of the car may be illuminated for the convenience of passengers boarding, or alighting from the car. Fig. 5 illustrates the application of the device to an automobile.

While the device may be used for closing a signaling circuit in case of the stoppage of any revoluble member, it is found of especial value in connection with street cars, automobiles, and similar vehicles, for displaying a warning signal at the rear of the vehicle when the latter stops or slows down, so that the danger of collision of following vehicles will be materially lessened.

I claim:—

1. A street car having signal lamps arranged approximately at the level of the steps, and extending through the dash board so that the steps will be illuminated, and a signal displayed at the rear of the car when the lamp is ignited, a source of electrical energy, and means operated by a revoluble member of the car for breaking the lamp circuit while the car is in motion and permitting the closing of said lamp circuit when the car stops.

2. In signaling devices for cars and the like, an electrically operated signal, a circuit including the signal, and a source of energy, a pair of stationary contact members forming terminals of the circuit, a revoluble shaft receiving motion from one of the car axles, a collar rigidly secured to the shaft, a second collar loose on the shaft, a plurality of weighted springs connecting the fast and loose collars and movable outward under centrifugal force, and a disk of conducting material carried by the loose collar and arranged to engage said stationary contacts and close the circuit when the car is stopped.

In testimony that I claim the foregoing as my own, I have hereto affixed my signature in the presence of two witnesses.

HERMAN WEBER.

Witnesses:
B. M. AITKEN,
C. C. NELSON.